June 10, 1969   R. SCHEUFLER   3,449,032
BEARING AND HOUSING INSTALLATION
Filed July 16, 1965   Sheet 1 of 4

Inventor:
ROLAND SCHEUFLER
BY Burgess, Dinklage & Sprung
ATTORNEYS.

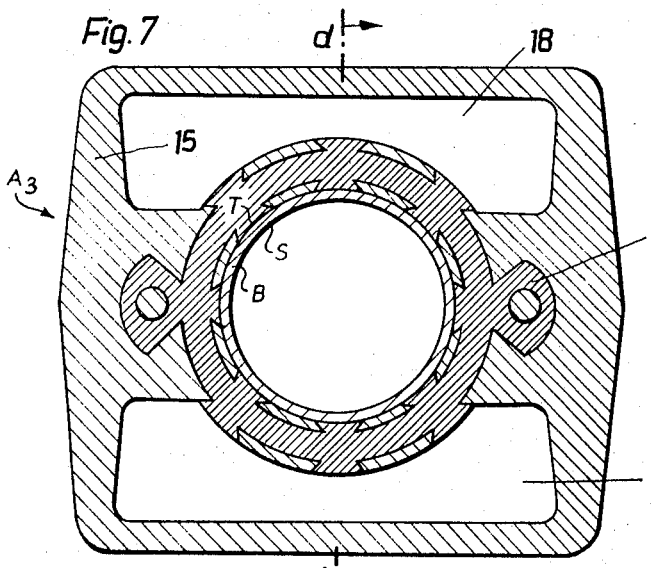
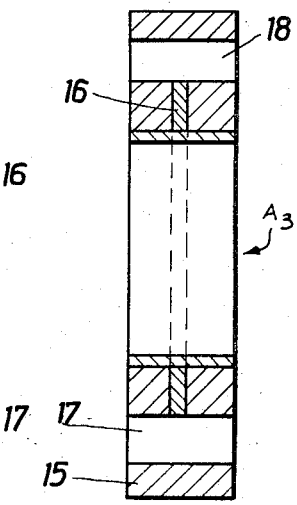
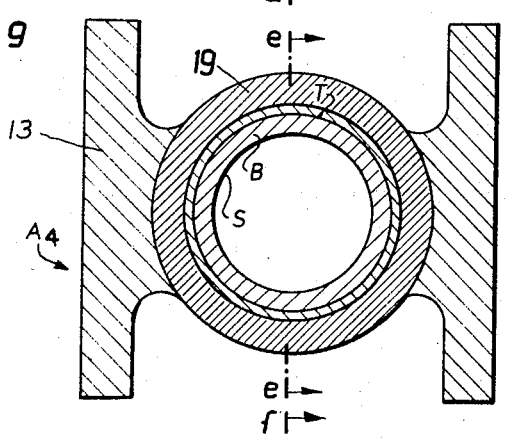
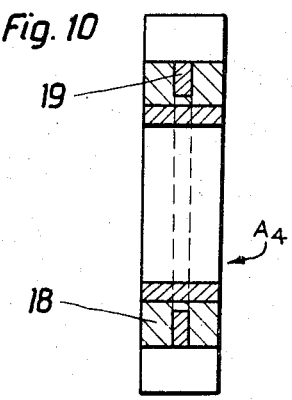
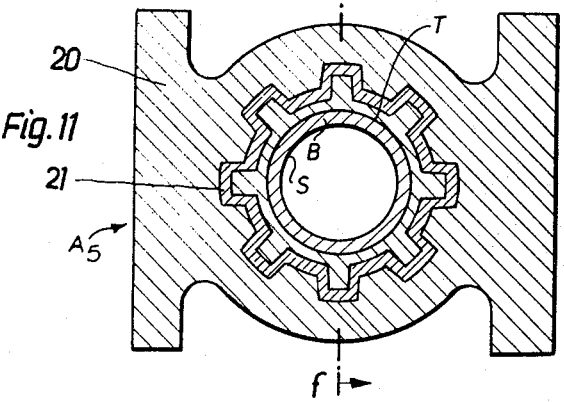
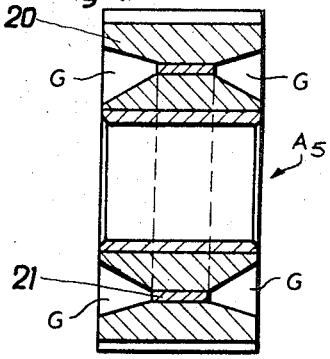

Inventor:
ROLAND SCHEUFLER
BY Burgess, Dinklage & Sprung
ATTORNEYS.

United States Patent Office 3,449,032
Patented June 10, 1969

3,449,032
BEARING AND HOUSING INSTALLATION
Roland Scheufler, Neckarsulm, Germany, assignor to Karl Schmidt G.m.b.H., Neckersulm, Germany, a corporation of Germany
Filed July 16, 1965, Ser. No. 472,510
Int. Cl. F16c *9/04*
U.S. Cl. 308—237                                    16 Claims

ABSTRACT OF THE DISCLOSURE

Journal bearing having embedded therein a steel reinforcing member disposed wholly within the bearing-bearing base.

---

This invention relates in general to bearings and support housings therefor, and more particularly to a journal bearing and housing installation wherein the bearing and housing are constructed of materials having different thermal expansion coefficients and in which an intermediate reinforcing member is utilized to control the resultant thermal expansion effect upon the bearing so as to provide a selected journal surface dimensional configuration over a predetermined temperature range.

The installation of aluminum bearings and steel plated friction bearings in aluminum housings causes considerable difficulty due to the different thermal expansion coefficients of the individual bearing and housing materials. In the warm operating state, a considerable increase of the bearing clearance can occur, while when the bearing is chilled, a reduction of clearance results. Particularly at temperatures below 0° C., it can happen that an aluminum bearing installed in a light-metal housing my shrink tightly onto a crankshaft journalled thereto, such as for example, in the case of an internal combustion engine having a crankshaft supported in such journal bearings. In this case, either it is impossible to start the motor because of the seizing of the crankshaft by the bearing, or the shrinkage results in the mutual destruction of the bearing parts since no lubricating film can buildup between the journalled crankshaft surface and the bore of the bearing.

Attempts have already been made to eliminate these shrinkage difficulties by providing greater bearing clearances. For most bearing installations, however, this is impractical, since excessive running noise develops at the larger bearing clearances required to avoid this shrinkage problem.

In the case of steel bearings press-fitted into light-metal housings, the press fit between the aluminum housing and the friction bearing tends to deteriorate in the operating state, so that in severe cases, the bearing eventually lies loose in the housing.

At low temperatures the aluminum housing shrinks onto the steel bearing and often this shrinkage tension results in a permanent stretching of the aluminum housing, or in a permanent compression of the steel bearing, so that when the bearing is restored to normal operation, an undesirably excessive clearance develops between the bearing seating surface and the outside diameter of the journalled shift. In this case, normal bearing operation is relatively noisy.

To avoid these disadvantages, and to be able to install both aluminum bearings and steel-clad bearings in light-metal housings in a reliable manner, it is proposed according to the invention to insert intermediate steel reinforcing members into the housing in the casting process. In this manner, an equalization of the different thermal expansions of the bearing and housing components is achieved, so that both the original bearing clearance and the bond between the bearing and housing are maintained.

These steel reinforcing members, which can be in the form of steel rings or shells, are preferably constructed with a toothed profile inner face surface for the purpose of anchoring them securely to the light-metal housing material. Also, for the same purpose these reinforcing members may be provided with recesses which are filled by the housing material during the casting thereof.

By an appropriate distribution of the housing material over the periphery of these steel reinforcing members, in accordance with the invention, it can be brought about that greater thermal expansion forces act upon the housing in the horizontal direction than act thereupon in the vertical direction, which generally corresponds to the main loading plane. This can be exploited according to the invention to achieve an advantageous predetermined ovalization of the bearing journal surface and/or the bearing seat in the housing.

In accordance with the invention, a bearing shell having a journal surface disposed for sliding contact with a rotatable member, such as a shaft, is supported by a housing made of a light-metal material such as aluminum, which has a substantially greater coefficient of thermal expansion than the bearing shell itself. An intermediate reinforcing member, such as a steel ring, or shell, is disposed in peripherally surrounding relation to the bearing shell, said reinforcing member being in turn peripherally surrounded by the housing. The reinforcing member and bearing shell are bonded together along their common interface surface for thermal expansion (and contraction) in unison, and the reinforcing member and housing are likewise bonded together along their common interface surface for thermal expansion (and contraction) in unison. By constructing the bearing shell, reinforcing member and housing from materials having respective coefficients of thermal expansion selected in relation to each other and to their respective effective thermal expansion resisting areas, a bearing journal surface having a corresponding dimensional configuration over a predetermined temperature range can be achieved.

By constructing the annular steel reinforcing members smaller in breadth than the breadth of the housing, a bearing bore surface can be produced which in the operating state, will have a hyperbolic longitudinal sectional shape, which is advantageous in that such a shape prevents edge pressures from being exerted between the bering and the journal shaft.

The oval bearing bore thereby achieved, as well as the hyperbolic bearing bore, can be varied as desired by appropriately shaping the steel ring insert members. For example, the longer axis of the oval bearing cross-section can thus be placed in the vertical plane. It has developed, particularly in the case of a number of cold-start experiments with internal combustion engines, that an oval bearing bore of this type has a very advantageous effect on the performance of the bearing. When the motor is started, the thick, viscous lubricating oil is given an opportunity to penetrate into the bearing through the small bearing clearances perpendicular to the direction of loading, so as to assure the building up of a lubricant oil film between the bearing and the journalled shaft. In the normal motor operating state, this bearing surface ovality is reduced automatically by the thermal expansions of the bearing, reinforcing member and housing resulting from the normally higher operating temperature.

These forces of thermal expansion, which depend upon the size of the recesses in the housing, can in turn be controlled by an appropriately shaped housing design, so that the bearing bore becomes circular at the end portions of the bearing so as to reduce the amount of oil which escapes from the bearing. This feature afforded by the invention is of considerable importance in view of the fact that in the normal operating state, the viscosity of the lubricating oil is greatly reduced as compared with its viscosity under cold-starting conditions.

The steel reinforcing rings or shells which according to the invention are cast into the light-metal bearing housings to achieve a suitable bonding thereto, can be either integrally constructed as in the case wherein they are used in solid housing, or can be split into two or more sections to accommodate their installation in split bearing housings. In the case of split bearing installations, the steel reinforcing members are peripherally divided in the same proportions as are the housing sections. It is preferable to make the cross-sectional areas of the rings larger in the direction of the bearing load at their split joints so as to increase their rigidity thereat.

If the coefficient of expansion of the housing material of the bearing of the invention is approximately the same as that of the material of the shaft journalled to such bearing, it is advantageous to diminish the rigidity of the steel reinforcing ring by notches or other recesses disposed along its inside and/or outside periphery.

It is therefore, an object of the invention to provide a bearing installation arrangement having a bearing shell with a bearing surface adapted to receive slidably thereon an element, such as a shaft, rotatable relative thereto.

Another object of the invention is to provide a bearing arrangement as aforesaid having reinforcing means for limiting the thermal expansion of the bearing shell to maintain a favorable bearing surface clearance in both the operating and non-operating state.

Another object of the invention is to provide a bearing arrangement as aforesaid wherein the bearing shell and reinforcing means are bonded together to prevent dissimilar relative thermal expansion such as would cause them to separate and move relative to each other.

Another object of the invention is to provide a bearing arrangement as aforesaid wherein the bearing shell and reinforcing means are supported fixedly together in a housing constructed of a light material having a high coefficient of thermal expansion.

Another object of the invention is to provide a bearing arrangement as aforesaid which is adapted for use with segmented or split bearings.

Another object of the invention is to provide a bearing arrangement as aforesaid having a bearing shell and reinforcing means so constructed and arranged in relation to each other that under normal operating temperatures their combined thermal expansion results in a bearing surface of selected cross-sectional configuration.

Another object of the invention is to provide a bearing arrangement as aforesaid wherein a minimum bearing surface clearance is provided at the more highly loaded areas thereof, and a greater bearing surface clearance is provided at the lightly loaded areas thereof for improved lubrication.

Other and further objects and advantages of the invention will become apparent from the following detailed description and accompanying drawings in which:

FIG. 7 is a transverse sectional view of another bearing arrangement constructed in accordance with the invention.

FIG. 8 is a longitudinal sectional view of the bearing arrangement of FIG. 7 taken along the line d—d therein.

FIG. 9 is a transverse sectional view of another bearing arrangement constructed in accordance with the invention.

FIG. 10 is a longitudinal sectional view of the bearing arrangement of FIG. 9 taken along the line e—e therein.

FIG. 11 is a transverse sectional view of another bearing arrangement constructed in accordance with the invention.

FIG. 12 is a longitudinal sectional view of the bearing arrangement of FIG. 11 taken along the line f—f therein.

FIGS. 1–18 illustrate the various embodiments of the bearing arrangement according to the invention.

Figure 1:
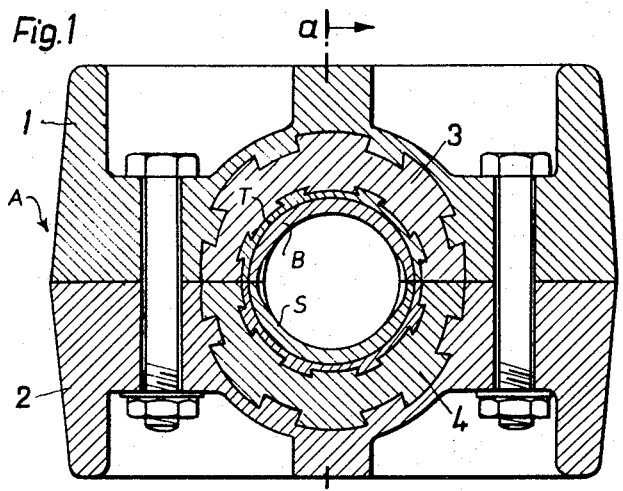
FIG. 1 is a transverse sectional view of a split bearing installation arrangement constructed in accordance with a preferred embodiment of the invention.

In general, each of these several embodiments provide a means, such as a bearing shell B having a bearing surface S which is adapted to receive slidably thereon an element such as for example, a shaft J (FIGS. 17 and 18) arranged for relative rotary movement with respect thereto. In addition to the bearing surface S, the bearing shell B has a bondable surface T remote from said bearing surface S.

The bearing shell B is supported by a reinforcing base means which includes a housing which can be either a solid housing as exemplified by the housings 5, 13, 15, 20, 27 and 30, or can be a split housing as exexmplified by the split housings 1, 2, 9, 10 and 22. The reinforcing base means also includes a reinforcing member, preferably in the form of a ring, or ring segment as exemplified by 3, 4, 6, 11, 12, 16, 19, 21, 23, 24, 28, 29 and 31.

In each case, the reinforcing member of the base means is provided with a bondable surface which is bonded, such as can be provided by integral casting to a corresponding portion of the remote surface T of the bearing shell B to prevent relative dissimilar thermal expansion (and also contraction) of said bearing shell B and reinforcing members 3, 4, 6, 11, 12, 16, 19, 21, 23, 24, 28, 29 and 31 of the base means.

As is commonly known, the housing elements 1, 2, 5, 9, 10, 13, 15, 20, 22, 27, and 30, the bearing shell elements B, and the reinforcing members 3, 4, 6, 11, 12, 16, 19, 21, 23, 24, 28, 29 and 31 used in the bearing arrangements A–A₈ of the invention as represented by FIGS. 1–8 are ordinarily constructed of materials such as metals, which have distinct coefficients of thermal expansion, such that when heated they expand, and when cooled they contract, or shrink.

It has been found in accordance with the invention that by constructing the bearing shell B, reinforcing member and housing elements of materials having respective coefficients of thermal expansion selected in relation to each other and to the respectively effective thermal expansion resisting areas of such elements, a selected bearing surface S diametral configuration can be attained, at a given temperature within the operating temperature range, and departures from such selected configuration can be controllably minimized over a predetermined operating temperature range (Note: thermal expansion is intended to designate generally both the linear expansion and diminution of the physical dimensions of an element therein.)

In the bearing arrangement of the invention, the bonded surface joint between the remote surface T of the bearing shell B and whatever reinforcing member or members are utilized defines a first interface surface along which the bearing shell B and such reinforcing member or members thermally expand in unison. The bonded surface joints between the reinforcing member or members and the housing defines a second interface surface along which such reinforcing member or members and the housing thermally expand in unison.

By applying conventional engineering stress-strain analysis techniques, and by taking into account the thermal expansion boundary conditions at these first and second interfaces, the bearing surface S diametral configuration can be determined for a given bearing shell B, reinforcing member, and housing geometry combination, with their respective materials being specified, for a given operating temperature range.

More important, by applying such techniques to a given set of basic bearing shell B surface S diametral configuration parameters, the relative cross sectional thicknesses and shapes of the bearing shell B, reinforcing member and housing elements which establish such respective thermal expansion resisting areas, can be readily determined for a selected material combination.

The bearing arrangement of the invention has found to be particularly useful in cases wherein it is desired to construct the housing element of a light metal, such as aluminum, which has a relatively high coefficient of thermal expansion as compared with that of the reinforcing members, which are preferably made of steel. The bearing shell B can be constructed of conventional bearing metal, such as Babbitt, white metal, or even aluminum or steel by reason of the dimensional control afforded by the reinforcing members used in the bearing arrangement of the invention.

As shown in greater detail, the bearing arrangement A of FIG. 1 shows a split bearing housing preferably made of aluminum, and comprising the housing half sections 1 and 2 which are respectively bonded to the half-ring inserts 3 and 4 which serve as reinforcing members. These half-ring inserts 3 and 4, which are preferably made of steel, are provided with dovetails disposed on their inside and outside peripheries, so as to provide a more secure connection between said inserts 3 and 4 and their respectively associated housing sections 1 and 2 than would otherwise be provided by mere surface bonding alone. This particular feature of the invention, as is apparent from the several embodiments shown in the drawings, is not necessarily restricted to any particular dovetail joint arrangement, but may be in general any arrangement wherein the bondable surface of the housing elements and the coresponding bondable surfaces of the reinforcing members are disposed for interlocking engagement with each other.

Figure 2:
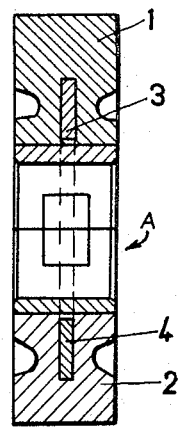
FIG. 2 is a longitudinal sectional view of the bearing arrangement of FIG. 1 taken along line a—a therein.
Figure 5:
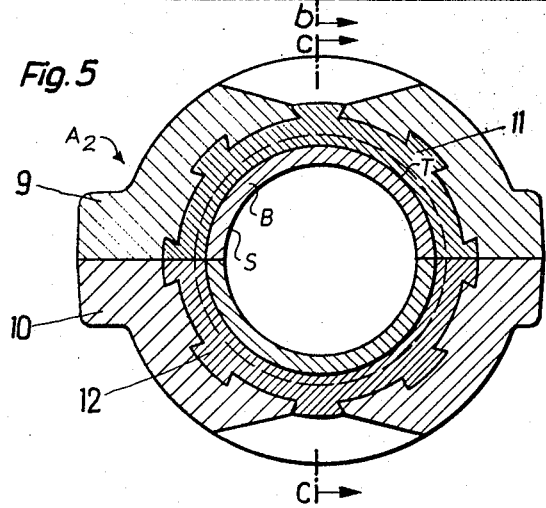
FIG. 5 is a transverse sectional view of another bearing constructed in accordance with the invention.
Figure 6:
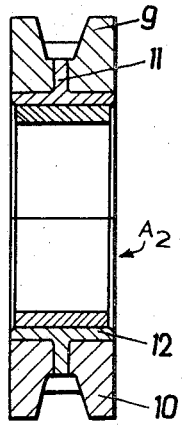
FIG. 6 is a longitudinal sectional view of the bearing arrangement of FIG. 5 taken along the line c—c therein.

As can readily be noted from FIGS. 1 and 2, the ring segments 3 and 4 are substantially coextensive in circumferential length with the housing segments 1 and 2 to which they are bonded, and in the case of the arrangement $A_7$ of FIGS. 5 and 6, they are also substantially coextensive in circumferential length with the bearing segments to which they are also bonded.

Figure 3:
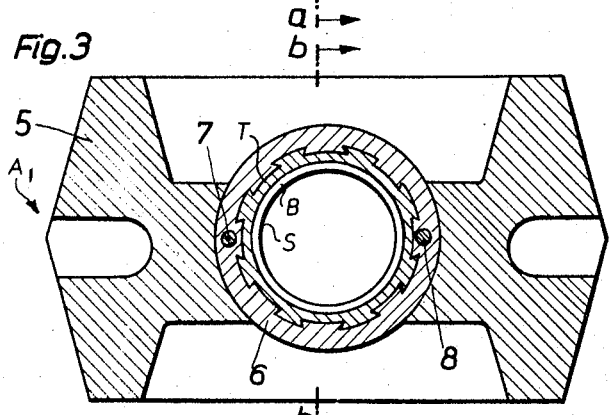
FIG. 3 is a transverse sectional view of a solid bearing installation arrangement constructed in accordance with a preferred embodiment of the invention.
Figure 4:
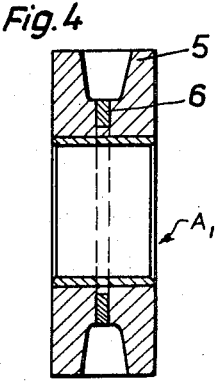
FIG. 4 is a longitudinal sectional view of the bearing arrangement of FIG. 3 taken along line b—b therein.

FIG. 3 shows a solid bearing housing 5 in which a likewise solid reinforcing ring 6 is provided, which has dovetails only along its inside periphery. Axially of this ring 6, two diametrically opposed holes 7 and 8 are additionally provided, which pass preferably all the way through the axial cross section of the ring 6, and are filled with the material of the housing.

Figure 13:
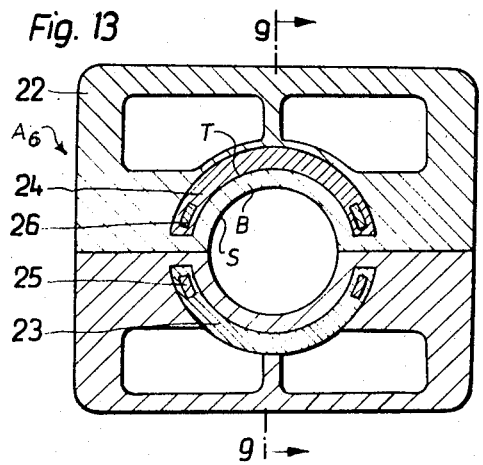
FIG. 13 is a transverse sectional view of another bearing arrangement constructed in accordance with the invention.

The bearing arrangements A, $A_2$, $A_6$ exemplified by FIGS. 1, 5 and 13 respectively illustrate that in such split or segmented bearing arrangements A, $A_2$, $A_6$, the housing element is constructed of a plurality of separable segments not necessarily limited to two segments or halves as in the aforesaid arrangements, and such segments are disposed for connection in adjoining relation to one another, such as for example, by bolting as in FIG. 1, so as to define a complete housing. The bearing shell B, in such cases comprises a corresponding plurality of segments disposed in adjoining relation to each other to define a complete bearing shell B when said corresponding housing segments are connected in adjoining relation to each other. Each of these bearing segments has a remote surface corresponding to a portion of the remote surface T of the complete bearing shell B. At least one reinforcing member is bonded to each housing segment and is also bonded to the remote surface of the bearing segment corresponding thereto.

In such segmented bearing arrangements, each reinforcing member segment is substantially coextensive in circumferential length with the housing and bearing shell segments to which it is bonded.

Depending upon the ultimate configuration of the bearing surface S desired under normal operating temperatures, the reinforcing members can be either substantially coextensive in breadth with the bearing shell B, or can be constructed with a breadth dimension smaller than that of the housing and/or bearing shell B to effect a thermal expansion deformation of the bearing shell B at the normal operating temperature thereof which causes the bearing surface S to assume a shape which is hyperbolic in longitudinal cross section.

FIG. 5 shows a bearing arrangement $A_2$ having a split bearing housing comprising the housing halves 9 and 10. The reinforcing ring halves 11 and 12 are of such shape and are so inserted as by a casting process, that their inside surfaces serve as a seating surface for the bearing shell B. These ring halves 11 and 12 extend, as is shown in FIG. 6, over the entire axial breadth of the installed bearing shell segments which make up the complete bearing shell B.

In FIG. 6, is represented the section c—c through the split bearing housing shown in FIG. 5.

FIG. 7 shows a bearing arrangement $A_3$ having a solid bearing housing 15, in which a solid steel reinforcing ring 16 is provided, which is similar to the previously described bearing arrangements, has dovetails at and along its inside and outside surfaces. The housing 15 is hollowed out in cross section over a portion of the ring 16, so that cavities 17 and 18 are formed. In this manner greater effective cross sectional housing areas are developed to resist horizontal expansion and to develop greater expansion forces for deforming the bearing bore surface S to a greater extent in the horizontal direction than in the vertical direction when the bearing shell B is subjected to the temperatures of normal operation. It can thus be brought about this design of the bearing shell B, that the bearing surface S diameter in the direction of the principal bearing loading plane becomes smaller in the operating state than when the bearing is initially placed in operation, since the inserted reinforcing ring 16 expands horizontally and is thereby narrowed vertically. In the case of operating temperatures below normal, a reduction of the bearing surface S diameter in the plane perpendicular to the plane of the principal bearing loading develops.

FIG. 8 shows more details of the bearing arrangement $A_3$ as viewed through the section d—d of the housing 15 in FIG. 7.

FIG. 9 shows a bearing arrangement $A_4$ having a solid housing element 13 and a continuous reinforcing ring 19. Because of the particular H-shaped configuration of the housing 13, the same type of thermal expansion deformation of the bearing surface S occurs under operating conditions, as described in connection with the bearing arrangement A₃ of FIGS. 7 and 8.

FIG. 10 shows the bearing arrangement A₄ in more detail as viewed through the section e—e taken in FIG. 9.

FIGS. 11 and 12 show a bearing arrangement A₅ having a solid bearing housing element 20 and a reinforcing ring 21 which is inserted during the casting of the housing 20 into the trapezoidal grooves G which are disposed in oppose relationship. By this design, the reinforcing ring 21 is imparted with a greater elasticity, which can be used advantageously for regulating the thermal expansion of the housing 20 and of the bearing shell B.

Figure 14:
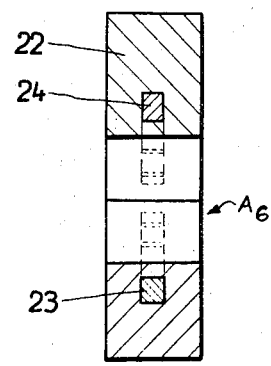
FIG. 14 is a longitudinal sectional view of the bearing arrangement of FIG. 13 taken along the line g—g therein.

FIGS. 13 and 14 show a bearing arrangment A₆ having a split bearing housing 22 and two cast-in half ring reinforcing members 23 and 24. The half rings 23 and 24 are provided with openings 25 and 26 respectively for increased elasticity. As can be noted from FIG. 13, the half rings 23 and 24 do not extend over the entire circumferential length of the bearing shell B but rather terminate slightly behind the junction or separation plane of the housing 22.

Figure 15:
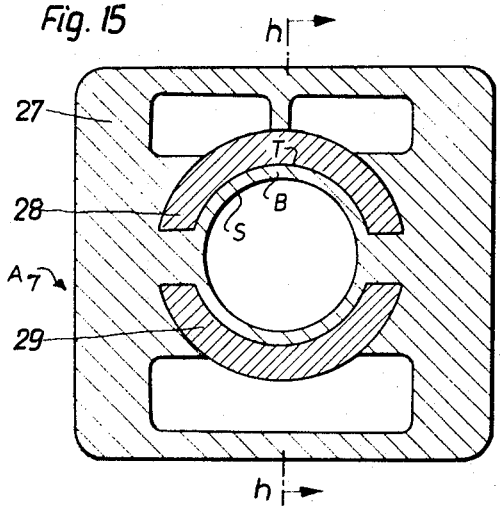
FIG. 15 is a transverse sectional view of another bearing arrangement constructed in accordance with the invention.
Figure 16:
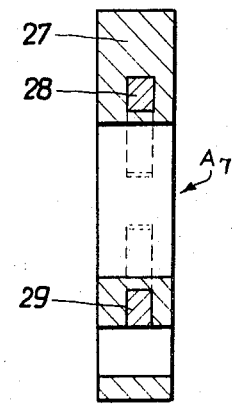
FIG. 16 is a longitudinal sectional view of the bearing arrangement of FIG. 15 taken along the line h—h therein.

FIGS. 15 and 16 show a bearing arrangement A₇ having a solid bearing housing 27 which is somewhat similar to the split housing 22 of FIG. 13 in regard to the arrangement of the reinforcing ring segments 28 and 29, which like the half ring reinforcing members 23 and 24 do not extend over the entire circumference of the bearing shell B.

Figure 17:
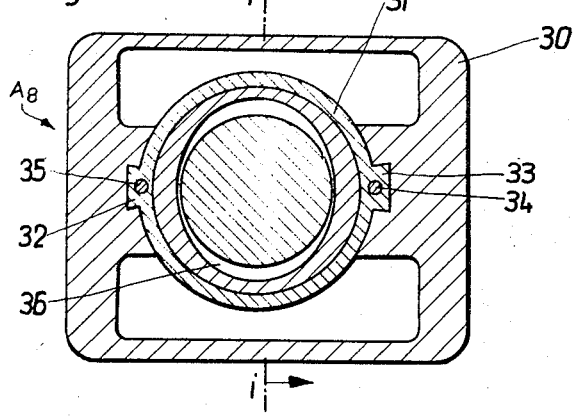
FIG. 17 is a transverse sectional view of still another bearing arrangement constructed in accordance with the invention.
Figure 18:
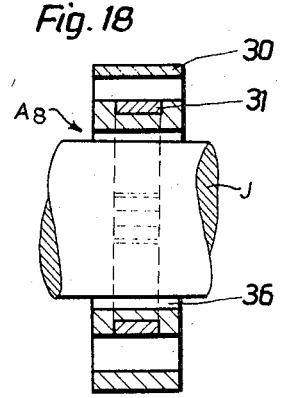
FIG. 18 is a longitudinal sectional view of the bearing arrangement of FIG. 17 taken along the line i—i therein.

FIGS. 17 and 18 represent a bearing arrangement A₈ having a solid bearing housing 30. In this particular arrangement, the bearing seat bore 36 of the bearing shell B is ovalized, and has a larger diameter along the vertical plane. The greater horizontal expansion forces produced by the operating temperature in such an arrangement tend to deform the ovalized bearing bore 36, depending upon the dimensions of the bearing components, so that a circular cylindrical, or even an inversely ovalized cylindrical bearing bore 36 can be produced in the running condition. A one-piece reinforcing ring 31 encompasses the entire circumference of the bearing shell B in the housing 30. This reinforcing ring 31 has in its horizontal plane, two diametrically opposed dovetails 32 and 33 which are pierced by two holes 34 and 35 which are filled with the material of the housing 30.

In certain cases of bearing arrangements having oval bearing surfaces S, it is expedient to place the greater bearing clearance in the unloaded areas of the bearing shell B. It has been found advantageous to provide a pair of strain-relieving apertures in the housing, such as for example the cavities 17 and 18 in the housing 15 of FIGS. 7 and 8, with such apertures being disposed in diametrically opposite relation to each other along the plane of the principal bearing shell B loading so as to produce under the temperatures of normal operation, an ovalized bearing surface S having a larger diametral plane disposed approximately perpendicular to the plane of principal bearing shell B loading. In such cases, the elasticity of the reinforcing members can be increased by providing them with one or more peripheral recesses (as shown in FIG. 17 at 34, or in FIG. 13 at 25 or 26) so that the combined thermal expansion of such reinforcing members and bearing shell B at the normal operating temperature effects a selected diminution of the ovality of the bearing surface S cross section.

Figure 19:
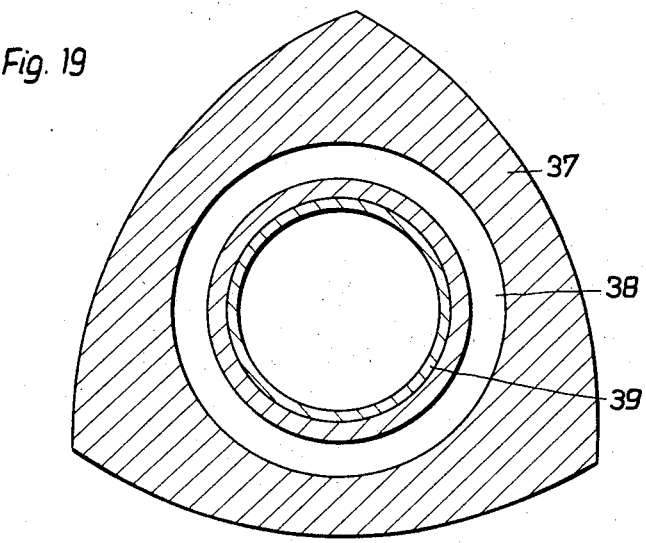
FIG. 19 is a transverse sectional view of a rotor of a rotary piston engine showing a typical installation therein of a bearing arrangement according to the invention.
Figure 20:
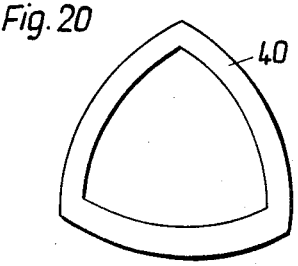
FIG. 20 is a end view of a typical reinforcing member which can be used in conjunction with the rotor shown in FIG. 19.

As illustrated by FIGS. 19–20, the invention is by no means limited in its application to any particular bearing housing structure, and can be expediently adapted for use in rotary piston engines (not shown). FIG. 19 shows a transverse cross section through a rotor 37 such as can be used in a rotary piston engine (not shown), said rotor 37 serving as a housing element for supporting the integrally cast steel ring reinforcing member 38 and a bearing shell or bushing 39.

FIG. 20 shows a steel reinforcing ring 40 designed for insertion about the outside contour of a rotor, such as the rotor 37 of a rotary piston engine (not shown). By means of a peripheral reinforcing ring, such as the ring 40, the thermal expansion of a rotor 37 can be controlled and thereby limited so as to produce a selected bearing surface S configuration under normal operating temperatures.

Figure 21:
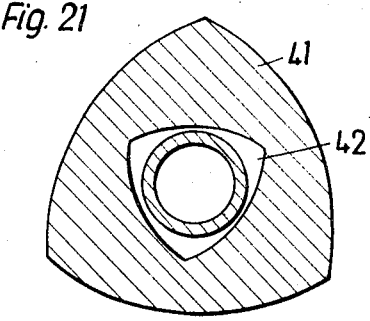
FIG. 21 is a transverse sectional view of another rotor somewhat similar to that of FIG. 19, and having an installed bearing arrangement according to the invention.

FIG. 21 shows another cross sectional view taken through a rotor 41, such as can be used in a rotary piston engine (not shown), and in which a steel reinforcing member 42 is inserted by an integrally casting process. As can be appreciated by the artisan, the triangular, arcuate shape of the exterior periphery of the ring 42 serves for an interlocking connection between said ring 42 and rotor 41, so as to provide additional holding strength over that provided by bonding along their respective interface surfaces.

The invention is also applicable to light-metal housings, such as aluminum or magnesium, in which roller bearings (not shown) are installed. Furthermore, the invention is by no means restricted to cases wherein the bearing housing element is stationary with respect to a machine frame (not shown) and wherein a journal element, such as a shaft rotates relative to the housing, but can also be used in cases where the journal shaft is stationary with respect to a machine frame (not shown), and wherein the bearing housing is rotated relative to the journal element.

What is claimed is:

1. A bearing assembly comprising a bearing housing, a bearing shell separate and distinct from said bearing housing and not in contact therewith having a generally cylindrical bearing surface adapted to receive slidably thereon an element arranged for rotary movement relative thereto, said bearing shell having a bondable surface remote from said bearing surface, a reinforcing member disposed in peripherally surrounding relation to said bearing shell, said reinforcing member having a first and a second bondable surface, said first bondable surface being disposed in contiguous adjoining relation to the bandable surface of said bearing shell and bonded thereto to define a first interface surface along which said bearing shell and reinforcing member thermally expand in unison, said housing being disposed in peripherally surrounding relation to said reinforcing member, said housing having a bondable surface disposed in contiguous adjoining relation to the second bondable surface of said reinforcing member and bonded thereto to define a second interface surface along which said housing and reinforcing member thermally expand in unison, said bearing shell, reinforcing member and housing being constructed of materials having respective coefficients of thermal expansion selected in relation to each other and to the respectively effective thermal expansion resisting areas thereof to prevent dissimilar relative thermal expansion therebetween and to produce a bearing surface having a selected diametral configuration over a predetermined operating temperature range wherein said reinforcing member is wholly surrounded by the combination of said bearing shell and said housing.

2. The bearing arrangement according to claim 1 wherein said bearing housing, bearing shell and reinforcing member each comprises a plurality of separable segments.

3. The bearing arrangement according to claim 2 wherein each reinforcing member is a steel ring.

4. The bearing arrangement according to claim 2 wherein each reinforcing member is a steel ring segment which is substantially coextensive in circumferential length with the housing and bearing segments to which it is bonded.

5. The bearing arrangement according to claim 3 wherein the steel ring reinforcing member is substantially coextensive in breadth with the bearing means.

6. The bearing arrangement according to claim 4 wherein each steel ring reinforcing member segment is substantially coextensive in breadth with the bearing segment to which it is bonded.

7. The bearing arrangement according to claim 1 wherein the housing is constructed of a material having a higher coefficient to thermal expansion than those of the reinforcing member and bearing shell materials.

8. The bearing arrangement according to claim 1 wherein the housing is constructed of aluminum and the reinforcing member is constructed of steel.

9. The bearing arrangement according to claim 1 wherein the housing is constructed of aluminum and the reinforcing member and bearing shell are constructed of steel.

10. The bearing arrangement according to claim 1 wherein said reinforcing member is substantially coextensive in breadth with said bearing shell.

11. The bearing arrangement according to claim 1 including means defining a pair of strain relieving apertures in said housing, said apertures being disposed in diametrically opposed relation to each other along the plane of principal bearing shell loading to produce under normal operation an ovalized bearing surface having its major axis disposed approximately perpendicular to the plane of principal bearing shell loading.

12. The bearing arrangement according to claim 1 wherein the bondable surface of said housing and the second bondable surface of said reinforcing member are disposed for interlocking engagement with each other.

13. The bearing arrangement according to claim 1 wherein said bearing shell as a cylindrical bearing surface of oval cross section disposed to define a minimum diametral plane oriented approximately coincident with the plane of principal bearing shell loading whereby a minimum bearing surface to rotary element clearance is provided along bearing surface areas of maximum loading and greater bearing surface to rotary element clearance is provided along bearing surface areas of lesser loading.

14. The bearing arrangement according to claim 1 including means defining at least one peripheral recess disposed in said reinforcing member to increase the elasticity thereof.

15. The bearing arrangement according to claim 1 wherein said bearing shell has a cylindrical bearing surface of oval cross section disposed to define a minor axis plane oriented approximately coincident with the plane of principal bearing shell loading whereby a minimum bearing surface to rotary element clearance is provided along bearing surface areas of maximum loading and greater bearing surface to rotary element clearance is provided along bearing surface areas of lesser loading, and including means defining at least one peripheral recess disposed in said reinforcing member to increase the elasticity thereof whereby the combined thermal expansion of said reinforcing member and bearing shell at the normal operating temperature thereof effects a diminution of the ovality of said bearing surface cross section.

16. The bearing arrangement according to claim 1 wherein said reinforcing member has a breadth dimension smaller than that of the housing to effect a thermal expansion deformation of the bearing shell at the normal operating temperature thereof wherein said bearing surface assumes a hyperbolic longitudinal cross section.

References Cited

UNITED STATES PATENTS

| | | | |
|---|---|---|---|
| 1,141,544 | 6/1915 | Helander et al. | 308—237 X |
| 1,652,468 | 12/1927 | Cutlin | 308—237 |
| 2,288,655 | 7/1942 | Smart | 308—237 X |
| 3,251,119 | 5/1966 | Kingsbury et al. | 308—237 X |
| 3,285,680 | 11/1966 | Dailey | 308—237 |
| 3,361,502 | 1/1968 | Weinkamer et al. | 308—237 |
| 1,770,582 | 7/1930 | Pike | 308—23 X |
| 1,868,937 | 7/1932 | Bugatti | 308—23 |
| 1,931,231 | 10/1933 | Luker | 308—23 |
| 2,324,676 | 7/1943 | Butterfield | 308—23 |
| 2,821,444 | 1/1958 | Brown | 308—23 |
| 2,997,347 | 8/1961 | Bauer | 308—23 |
| 3,013,542 | 12/1961 | Freyn | 308—23 X |
| 3,046,953 | 7/1962 | Dolza | 308—23 X |
| 3,089,735 | 5/1963 | Mann | 123—195 X |

FOREIGN PATENTS

| | | |
|---|---|---|
| 1,163,360 | 4/1948 | France. |
| 1,149,198 | 5/1963 | Germany. |
| 1,178,085 | 12/1958 | France. |

MARTIN P. SCHWADRON, *Primary Examiner.*

FRANK SURKO, *Assistant Examiner.*

PO-1050
(5/69)

UNITED STATES PATENT OFFICE
CERTIFICATE OF CORRECTION

Patent No. 3,449,032     Dated June 10, 1969

Inventor(s)  ROLAND SCHEUFLER

It is certified that error appears in the above-identified patent and that said Letters Patent are hereby corrected as shown below:

Column 1, line 35, "my" should be --may--; column 1, line 61, "shift" should be --shaft--; column 2, line 45, "bering" should be --bearing--; column 3, line 7, "housing" should be --housings--; column 4, line 28, "a end" should be --an end-- column 4, line 47, "exexmplified" should be --exemplified--; column 5, line 33, "has found" should be --has been found--; column 5, line 67, "$A_7$" should be --$A_2$--; column 7, lines 9 and 10, "oppose" should be --opposite--; column 8, line 40, "bandable" should be --bondable--; column 9, line 30, "as" should be --has--

SIGNED AND
SEALED
MAY 19 1970

(SEAL)
Attest:

Edward M. Fletcher, Jr.
Attesting Officer

WILLIAM E. SCHUYLER, JR.
Commissioner of Patents